July 5, 1927.
E. BECHER
1,634,316
MASSAGING HEATING ROLLER
Filed March 27, 1926
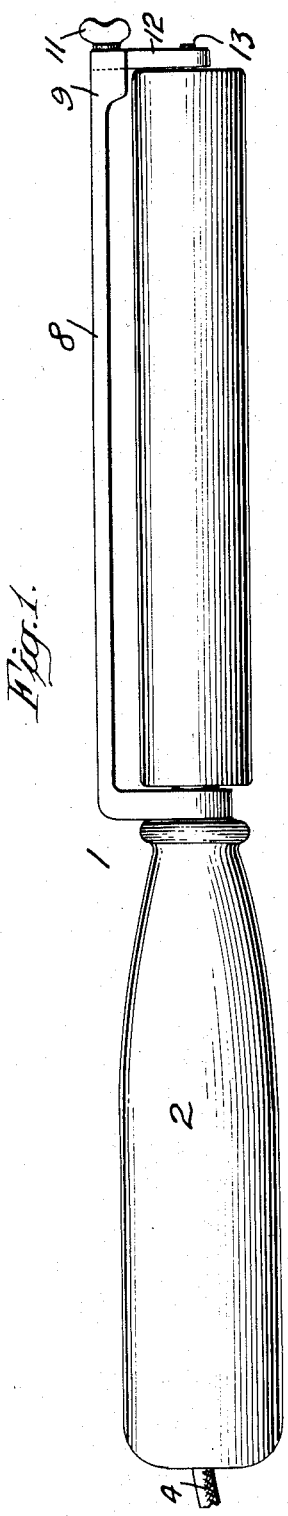
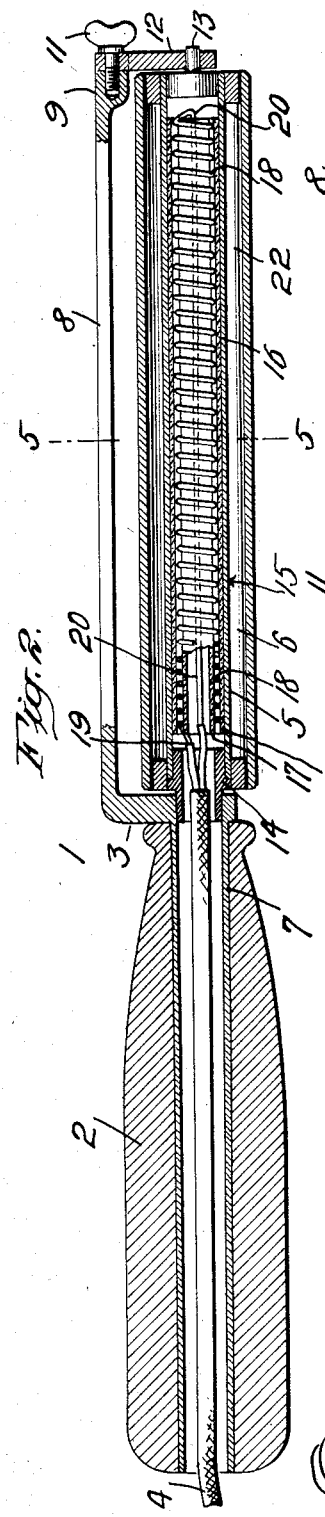
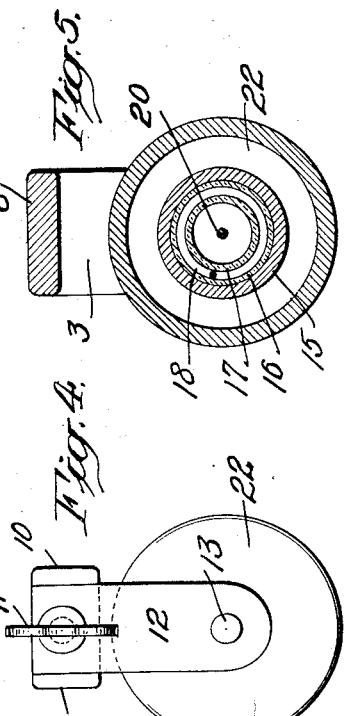
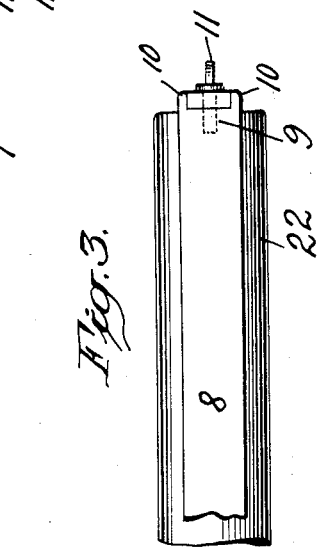
INVENTOR
EDWARD BECHER
BY
ATTORNEY Patented July 5, 1927.

1,634,316

UNITED STATES PATENT OFFICE.

EDWARD BECHER, OF NEW YORK, N. Y.

MASSAGING HEATING ROLLER.

Application filed March 27, 1926. Serial No. 97,862.

The object of my invention is to provide a roller of this class which can be heated without giving too intense a heat and which can be rolled over the flesh of a patient while held by a handle. More particularly the invention involves a structure wherein the electric heating parts are fixed relatively to the handle so that there are no sliding contacts. This object is accomplished by my invention, one embodiment of which is hereinafter more particularly set forth.

For a more particular description of my invention, reference is to be had to the accompanying drawings, forming a part hereof, in which Figure 1 is a side elevation of a tool embodying my improvement.

Figure 2 is a longitudinal section of the same.

Figure 3 is a plan view of a portion of this instrument.

Figure 4 is an enlarged end view of the same, and

Figure 5 is an enlarged section, taken on the line 5—5 of Figure 2.

Throughout the various views of the drawings, similar reference characters designate similar parts.

My improved massaging tool or instrument 1 is composed of a handle 2, a frame 3 on which the handle is mounted, an electric conductor with two wires 4, a heating element 5 with a cylindrical wall and a roller 6 with internal flanges revolving on the exterior of the heating element.

The handle 2 may be made of any desired shape and size and it is hollow to receive the hollow tang 7 of the frame 3. At one end of the handle this frame extends laterally until clear of the roller 6 and then it runs parallel to the roller 6, as shown at 8, to its enlarged end 9. This enlarged end has two projections 10 and a screw threaded hole adapted to receive a thumb screw 11 which passes through the removable end 12 of the frame 3. This end 12 is perforated to receive a lug 13 which is fixed to one end of the heating element 5.

The conductor 4 runs through a boss 14 which is fixed in one end of a cylinder 15 of the heating element and the lug 13 is at the other end of this cylinder. This cylinder is lined with an insulator, such as asbestos 16, and inside this and concentric with it is another asbestos or similar cylinder 17 and between these two cylinders is a spiral heating element 18 with its ends connected to conductors 19 and 20, the end 19 being connected to the end of the spiral next to the handle 2 and the conductor 20 extends through the center of the cylinder 17 to the end remote from the handle 2 and there joins the spiral 18 with which it is preferably made integral. The joint of the wire 20 is preferably made near the handle 2.

The roller 6 has internal end flanges 21 which may be made integral with the cylindrical part of this roller and these flanges turn freely on the cylindrical surface 16 of the heating element. An air space 22 is preserved between the roller 6 and cylinder 15. The frame 3 with its laterally extending parts, one next to the handle 2 and the other the end 12, keeps the roller 6 on the cylinder 15.

In view of the foregoing, the use of my instrument will be readily understood. Assuming electric energy is turned on to the heating element through the conductor 4 and the same is heated, this heat radiates out through the asbestos or other lining 16 and is conducted through the cylinder 15, which is preferably made of brass, or similar heat conducting material, and from thence is passed through the air space 22 to the cylinder 6 which is never overheated because of the air space. Once the roller 6 is sufficiently warm, it is rolled over the surface to be massaged, back and forth, as much as desired, and if necessary any liniment or other material may be spread on this surface before this rolling so as to cause the same to be absorbed by the skin of the patient. When the massaging is ending, the current may be shut off from the conductors 4 and the operation continued for several minutes because the roller 6 will continue to be hot for a time during the cooling heating element.

While I have shown and described one embodiment of my invention, it is obvious that it is not restricted thereto, but that it is broad enough to cover all structures that come within the scope of the annexed claims.

Having thus described my invention, what I claim is:

1. A massage instrument comprising a hollow handle, a U-shaped frame secured to said handle, a heating element fixed to said handle and projecting longitudinally therefrom and a roller mounted rotatably upon said heating element and restrained by said frame from longitudinal movement.

2. A massage instrument, a heating element with an exterior, cylindrical surface, a roller with an air space mounted rotatably on said cylindrical surface and means for keeping the roller from shifting longitudinally.

3. A massage instrument, a hollow handle with a frame secured thereto, a heating element fixedly mounted in said frame, a roller rotatably mounted on said heating element and prevented from excessive longitudinal movement by said frame.

4. A massage instrument, a handle, a frame with a hollow shank passing through said handle, an electric heating element fixedly mounted in said frame and having a cylindrical outer surface and means for supplying said heating element with electricity and a cylindrical roller with internal flanges resting on and turning on said heating element so that an air space is preserved between the greater portion of said roller and said heating element, whereby the roller will function at a suitable temperature.

5. A massage instrument comprising a handle, a heating element carried by said handle, a frame also carried by said handle and a removable outer portion upon said frame for assisting in supporting said heating element.

6. A massage instrument comprising a handle, a heating element carried by said handle, a frame also carried by said handle, a roller carried by said heating element, a removable outer portion upon said frame for assisting in supporting said heating element and maintaining said roller upon said heating element.

7. A tool of the class described comprising a handle, a heating element fixed to said handle and extending longitudinally from one end thereof and a roller mounted rotatably upon said heating element and having the greater portion thereof spaced from said heating element.

In testimony whereof, I have hereunto set my hand this 23d day of March, 1926.

EDWARD BECHER.